(12) United States Patent
Karri et al.

(10) Patent No.: US 11,995,422 B2
(45) Date of Patent: May 28, 2024

(54) MICROSERVICE DEPLOYMENT IN INTEGRATION AND API LAYERS USING AUGMENTED REALITY

(71) Applicant: INTERNATIONAL BUSINESS MACHINES CORPORATION, Armonk, NY (US)

(72) Inventors: Venkata Vara Prasad Karri, Visakhapatnam (IN); Abhishek Jain, Baraut (IN); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 88 days.

(21) Appl. No.: 17/469,684

(22) Filed: Sep. 8, 2021

(65) Prior Publication Data

US 2023/0073143 A1 Mar. 9, 2023

(51) Int. Cl.
*G06F 8/60* (2018.01)
*G06F 8/70* (2018.01)
(Continued)

(52) U.S. Cl.
CPC ............. *G06F 8/60* (2013.01); *G06F 8/70* (2013.01); *G06T 19/006* (2013.01); *H04L 67/133* (2022.05)

(58) Field of Classification Search
None
See application file for complete search history.

(56) References Cited

U.S. PATENT DOCUMENTS

2019/0221214 A1* 7/2019 Bostick ............... H04L 51/066
2020/0098153 A1* 3/2020 Arden ................. G06T 11/001
(Continued)

OTHER PUBLICATIONS

Gunaratne, I., "Wiring Microservices, Integration Microservices & APIs, Composing a Microservices based Enterprise Solution with MSF4J, BallerinaLang and WSO2 API Manager," [online] Medium. Com, Dec. 5, 2017, retrieved from the Internet: <https://medium.com/containermind/wiring-microservices-integration-microservices-apis-a0c211e43bc1>, 12 pg.
(Continued)

*Primary Examiner* — Qing Chen
(74) *Attorney, Agent, or Firm* — CUENOT, FORSYTHE & KIM, LLC (57) ABSTRACT

An augmented reality (AR) development system includes computer hardware including an AR system and a development server. The development server is configured to perform identifying a plurality of microservices to be deployed into an architecture, at least one integration layer in the architecture, and at least one application programming interface (API) layer in the architecture. The AR system is configured to perform generating a first visualization of the architecture that includes: a plurality of representations respectively corresponding to the plurality of microservices to be deployed in the architecture and a plurality of distinct and visually identifiable locations that respectively correspond to a unique combination of a specific API layer and a specific integration layer; receiving an indication for modifying a placement of one of the plurality of microservices within the first visualization; and generating a second visualization of the architecture based upon the indication.

20 Claims, 8 Drawing Sheets

(51) Int. Cl.
    *G06T 19/00*           (2011.01)
    *H04L 67/133*        (2022.01)

(56) References Cited

U.S. PATENT DOCUMENTS

2020/0296017 A1*  9/2020  Mazzitelli ............... H04L 41/22
2020/0341876 A1* 10/2020  Gandhi .................. G06F 9/546
2021/0271882 A1*  9/2021  Waicberg ........... H04L 65/1069

OTHER PUBLICATIONS

Mell, P et al., The NIST Definition of Cloud Computing, National Institute of Standards and Technology, U.S. Dept. of Commerce, Special Publication 800-145, Sep. 2011, 7 pg.

Nakazawa, R et al., "Visualization Tool for Designing Microservices with the Monolith-First Approach," In 2018 IEEE Working Conf. on Software Visualization (VISSOFT), Sep. 24, 2018, pp. 32-42.

"Visualizing a Microservices Architecture with AHAS," [online] Alibaba Cloud, Medium.com, Apr. 2, 2019, retrieved from the Internet: <https://alibaba-cloud.medium.com/visualizing-a-microservices-architecture-with-ahas-d763167013b7>, 9 pg.

"Microservice Applications," [online] © CloudBees, Inc. 2010-2021, retrieved Apr. 14, 2021, retrieved from the Internet: <https://docs.cloudbees.com/docs/cloudbees-cd/latest/deploy-automation/microservices-containers>, 15 pg.

"Microservice Visualization," [online] © Datadog 2021, retrieved Apr. 14, 2021, retrieved from the Interent: <https://www.datadoghq.com/microservice-visualization/>.

* cited by examiner

MICROSERVICE DEPLOYMENT IN INTEGRATION AND API LAYERS USING AUGMENTED REALITY

BACKGROUND

The present invention relates to computer-implemented microservices, and more specifically, to deploying microservices with API (Application Programming Interface) layer(s) and integration layer(s) using AR (Augmented Reality).

Software architecture is evolving into a microservice approach. Legacy approaches oftentimes involve a monolithic architecture using a large, tightly-coupled application. By comparison, microservices (also referred to as microservice architecture) are a cloud-native architectural approach in which a single application is composed of many loosely-coupled and independently-deployable smaller components or services (i.e., microservices) that are networked together (e.g., as nodes in a network).

The multitude of microservices that make up an application can be connected to one another in a multitude of different ways. For example, individual microservices can be connected in a chain (i.e., serially) and/or as a tree structure and share data amongst one another. For example, a first microservice can provide first dataset to a second microservice that uses that first dataset to generate a second dataset than is then provided to a third microservice.

Microservices typically have the following characteristics. They have their own technology stack, inclusive of the database and data management model. Additionally, microservices can communicate with one another over a combination of REST APIs, event streaming, and message brokers. Also, microservices can be organized by business capability with the line separating services often referred to as a bounded context.

There are a number of benefits of a microservice architecture over a monolithic architecture. These benefits include that the code can be updated more easily as new features or functionally can be added without modifying the entire application. Additionally, different stacks and different programming languages can be used for each of the different components. In other words, they can be independently deployable as well as independently modifiable. Still further, the different components can be scaled independently of one another, which reduces the waste and cost associated with having to scale entire applications because, for example, a single feature might be facing too much load. Loose coupling between microservices also builds a degree of fault isolation and better resilience into applications.

Contains are oftentimes used to deploy microservices. Containers are generally described as executable units of software in which application code is packaged, along with its libraries and dependencies, in common ways so that it can be run anywhere, whether it be on desktop, traditional IT, or the cloud. Containers take advantage of a form of operating system (OS) virtualization in which features of the OS are leveraged to both isolate processes and control the amount of CPU, memory, and disk that those processes have access to. Containers are small, fast, and portable—unlike a virtual machine, containers do not need include a guest OS in every instance and can, instead, simply leverage the features and resources of the host OS. Due to a combination of their deployment portability/consistency across platforms and their small size, containers are an ideal fit for modern development and application patterns, such as microservices, that can be built as regular code deployments in small increments.

Figure 1:
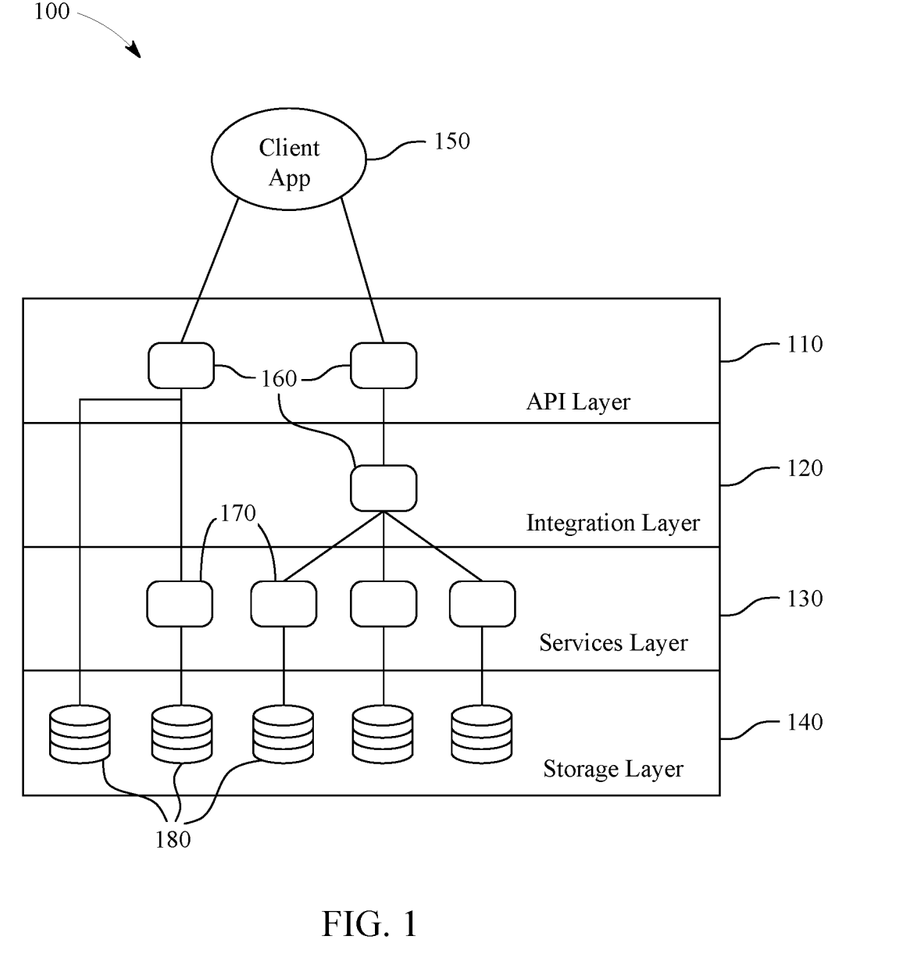
FIG. 1 is a block diagram illustrating a conventional microservice architecture.

FIG. 1 is an example description of a conventional microservice architecture 100. The microservice architecture 100 can comprise a number of layers including an API layer 110, an integration layer 120, a services layer 130, and a storage layer 140. A client application 150 typically interacts with the architecture 100 using APIs exposed by microservices 160 within the API layer 110. Working from the bottom-up, the storage (or data) layer 140 includes the data storage 180 for the architecture 100. The services layer includes the actual business logic and services 170 offered to the client application 150. This business logic and services can be in the form of traditional applications and/or microservices. In the context of a loan application, for example, individual business logic and services 170 may include a customer service, a credit service, and a loan service, and each of these services 170 may interact with data storage 180 contained within the storage layer 140. The integration layer 120 provides the capability required by different services and microservices within the architecture 100 to interact with one another. This capability can also be provided by microservices 160. As the used herein, the API layer 110 refers to the particular API being exposed to the client application 150, and the particular API may be associated with one or more microservices 160. As also used herein, the integration layer 120 refers to the particular integration microservice that performs the integration function (i.e., facilitating communication between the various services, microservices, and applications within the architecture 100).

SUMMARY

A computer-implemented process for microservice deployment using an augmented reality (AR) development system including an AR system and a development server includes the following operation. Using, the development server, a plurality of microservices to be deployed into an architecture, at least one integration layer in the architecture, and at least one application programming interface (API) layer in the architecture are identified. A first visualization of the architecture that includes a plurality of representations respectively corresponding to the plurality of microservices to be deployed in the architecture and a plurality of distinct and visually identifiable locations that respectively correspond to a unique combination of a specific API layer and a specific integration layer are generated using the AR system. An indication for modifying a placement of one of the plurality of microservices within the first visualization is received using the AR system. A second visualization of the architecture is generated using the AR system based upon the indication.

An augmented reality (AR) development system includes computer hardware including an AR system and a development server. The development server is configured to perform identifying a plurality of microservices to be deployed into an architecture, at least one integration layer in the architecture, and at least one application programming interface (API) layer in the architecture. The AR system is configured to perform generating a first visualization of the architecture that includes: a plurality of representations respectively corresponding to the plurality of microservices to be deployed in the architecture and a plurality of distinct and visually identifiable locations that respectively correspond to a unique combination of a specific API layer and a specific integration layer; receiving an indication for modifying a placement of one of the plurality of microservices within the first visualization; and generating a second visualization of the architecture based upon the indication.

A computer program product for microservice deployment using an augmented reality (AR) development system including an AR system and a development server includes computer readable storage medium having stored therein program code. The program code, which when executed by the AR development system, cause the AR development system to perform the following operations. Using, the development server, a plurality of microservices to be deployed into an architecture, at least one integration layer in the architecture, and at least one application programming interface (API) layer in the architecture are identified. A first visualization of the architecture that includes a plurality of representations respectively corresponding to the plurality of microservices to be deployed in the architecture and a plurality of distinct and visually identifiable locations that respectively correspond to a unique combination of a specific API layer and a specific integration layer are generated using the AR system. An indication for modifying a placement of one of the plurality of microservices within the first visualization is received using the AR system. A second visualization of the architecture is generated using the AR system based upon the indication.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 2:
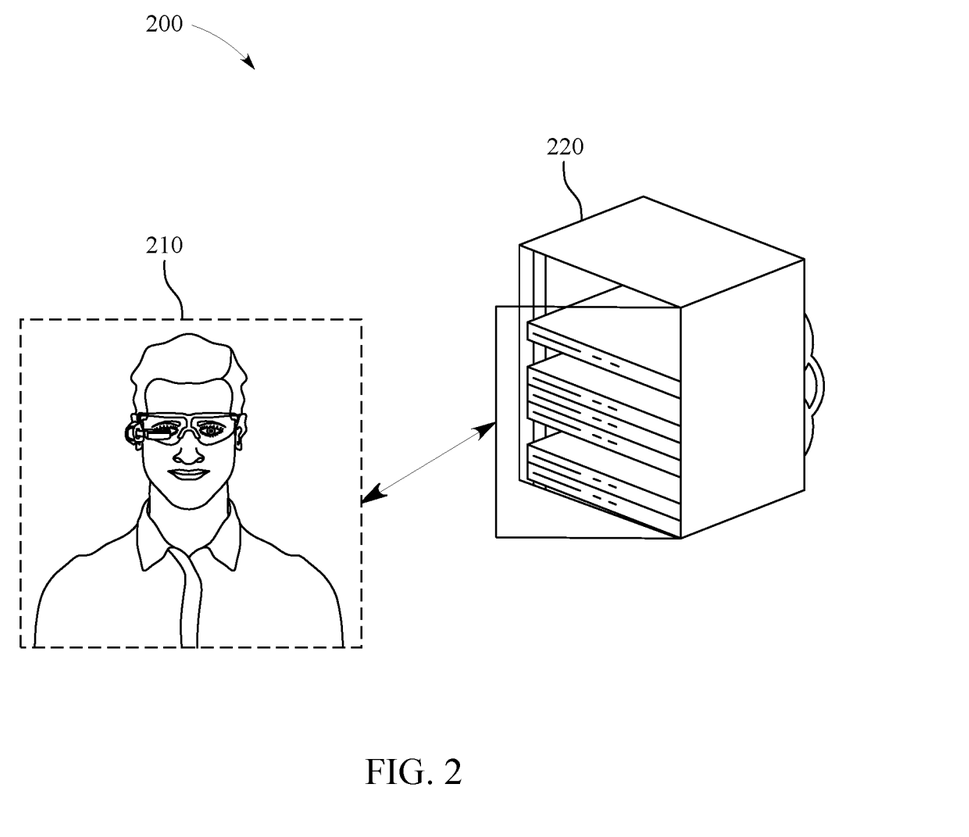
FIG. 2 is block diagram illustrating an example architecture having an augmented reality (AR) system and development server according to an embodiment of the present invention.
Figure 3:
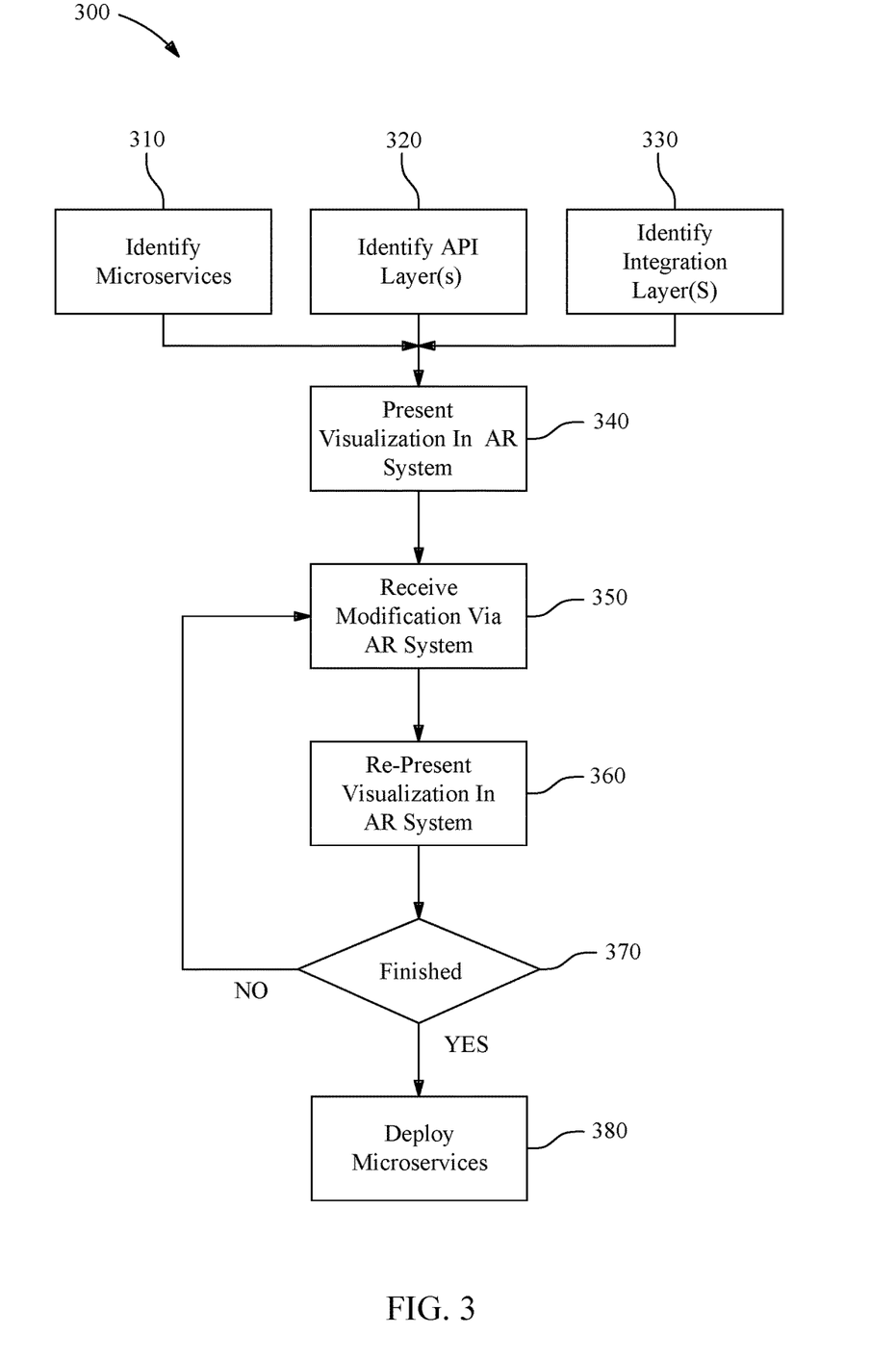
FIG. 3 illustrating an example method using the architecture of FIG. 2 according to an embodiment of the present invention.

Reference is made to FIG. 2 and FIG. 3, which respectively illustrate an augmented reality (AR) development system 200 including an augmented reality (AR) system 210 and development server 220 and methodology 300 for microservice deployment. Referring to FIG. 3 and operations 310, 320, and 330, microservices 150, API layer(s) 110, and integration layer(s) 120 to be used with the microservice architecture 100 are uniquely identified. The methodology 300 is not limited in the manner in which this is accomplished. For example, a developer may individually select specific microservices 150 and/or predefined groups of microservices 150. Additionally, a developer may individual select specific API layer(s) 110 and/or specific integration layer(s) 120. In addition to or alternatively, when a developer selected a specific microservice 150, the development server 220 can automatically select API layer(s) 110 and/or specific integration layer(s) 120 that are typically associated with the specific microservice 150. In yet another example, groupings of two or more of the microservices 150, API layer(s) 110, and integration layer(s) 120 can be selected together. The development server 220 is not limited and can use any known system used for software development.

Figure 4:
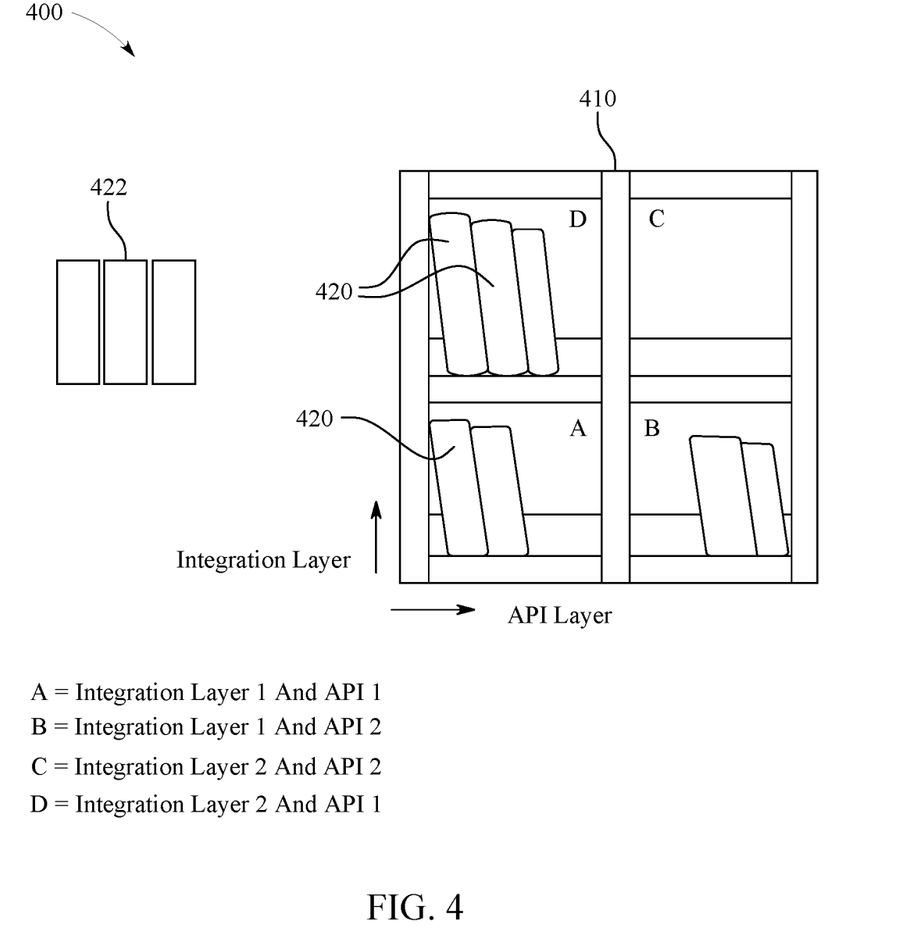
FIG. 4 is an example visualization displayed by the AR system of FIG. 1 according to an embodiment of the present invention.

Referring to operation 340 and also to FIG. 4, the AR system 210 generates a visualization 400 of the selected microservices 150, API layer(s) 110, and integration layer(s) 120 to be used with the microservice architecture 100. The visualization 400 can assist a developer in identifying those microservices 420 already deployed and microservices 422 needed to be deployed. The visualization 400 can also assist a developer in understanding the mapping of each microservice 420 to combinations of an API layer 110 and integration layer 120. The visualization 400 includes a plurality of distinct and visually identifiable locations (e.g., cubbies A, B, C, D) that respectively correspond to a unique combination of a specific API layer 100 and specific integration layer 120.

The particular visualization illustrated in FIG. 4 is intended to be exemplary of the different types of visualizations 400 possible and the methodology 300 and AR development system 200 are not intended to limited to a particular visualization 400. Another example of a visualization could be a multi-story apartment building. For example, each floor of the building could represent an API layer 110, each apartment in a floor could represent an integration layer 120, and microservices 150 could be represented as objects (e.g., furniture) being placed within a particular apartment in a particular floor.

In the exemplary visualization 400, microservices 420, 422 are depicted as books that can be played in various individual cubbies A, B, C, D of a bookshelf 410. Each individual cubby can represent a unique combination of API layer 110 and integration layer 120. As illustrated, cubby A is a combination of API layer 1 and integration layer 1; cubby B a combination of API layer 2 and integration layer 1; cubby C a combination of API layer 2 and integration layer 2; and cubby D a combination of API layer 1 and integration layer 2.

As illustrated, a microservice 420 can be positioned within a cubby A, B, C, D of the bookshelf 410 or the microservice 422 can be external to the bookshelf 410 and not associated to a combination of a particular API layer and integration layer. The microservice 422 being external to the bookshelf can be, for example, after the microservice 422 is initially selected and does not yet have an association with a combination of a particular API layer and integration layer. As another example, the microservice 422 could have previously had an association with a combination of a particular API layer and integration layer but one of the particular API layer and integration layer were removed—i.e., the microservice was "orphaned."

Referring back to FIG. 3 and operation 350, the AR system 210 is used to modify the architecture 100 represented in the visualization. For example, the developer of the AR system 210 could pick up an orphaned microservice 422, as a book, and place the book into one of the cubbies A, B, C, D. In so doing, the microservice 422 would be assigned to (i.e., integrated within) the combination of API layer 110 and integration layer 120 associated with the particular cubby A, B, C, D, selected. Additionally a developer may selectively add, subtract, or replace (i.e., both an add and a subtract) an API layer 110 and/or an integration layer 120 with regard to the microservice architecture 100 associated with the visualization 400.

Additionally, the developer of the AR system 210 can select any one of the microservices 420, 422, cubbies A, B, C, D, API layer(s), and integration layer(s) and visually receive information about the selected object that would be useful in constructing the microservice architecture 100. Although not limited in this manner, these interactions can be in the form of hand and/or finger gestures.

As part of the process of modifying the microservice architecture 100, the AR development system 200 can react to the selection of a particular microservice 420, 422 by contextually evaluating the microservice 420, 422 with regarding to the combination of API layer(s) and integration layer(s) being visualized in the visualization 400. For example, the AR development system 200 may determine that the microservice 420, 422 cannot be deployed in certain combinations (e.g., cubbies A, B, C, D) based upon the contextual evaluation and present a notification to the developer via the AR development system 200. Although not limited in a particular manner, the notification can take the form of preventing the developer from dropping the microservice 420, 422 into a particular combination. In addition to or alternatively, the notification can be a visual notification, e.g., the cubbies A, B, C, D to which insertion is being prohibited being given distinct visually markings. In addition to or alternatively, a haptic effect may be provided via the AR development system 200 upon the developer attempting to drop a microservice 420, 422 into one of the prohibited cubbies A, B, C, D. With these notification, the AR development system 200 alerts the developer that a particular deployment is not proper.

Additionally, the AR development system 200 may determine, after the selection of particular microservice 420, 422, that none of the combinations A, B, C, D, of API layers(s) and integration layer(s) match the requirement of the particular microservice 420, 422 being implemented. In this instance, the AR development system 200 can propose an additional API layer and/or integration layer that could be added to the microservice architecture 100. In addition to or alternatively, the AR development system 200 can propose one or more different microservices, as an appropriate alternative to the particular microservice 420, 422, that would fit within the pre-existing combinations A, B, C, D, of API layer(s) and integration layer(s). The developer can then select to add one of the proposed additional API layer and/or integration layer into the microservice architecture 100 and/or select to add one of the proposed alternative microservices into the microservice architecture 100.

In operation 360, based upon the modification to the microservice architecture 100 in operation 350, the visualization 400 of the microservice architecture 100 being presented to the developer via the AR development system 200 will be re-presented using a second visualization. For example, if an orphaned microservice 422 is placed with a particular cubby A, B, C, D, that microservice 420 will then be displayed as being within one of the cubbies A, B, C, D of the bookshelf 410. As another example, the additional of an API layer and/or integration layer will add cubbies to the bookshelf 410. Conversely, the subtraction of an API layer and/or integration layer will subtract cubbies from the bookshelf 410. If, for example, there were microservices 420 illustrated as being within a particular cubby A, B, C, D and that particular cubby A, B, C, D is removed because of the removal of the API layer and/or integration layer, then the microservice 422 can be illustrated as being orphaned—i.e., outside of the bookshelf 410. Display of an orphaned microservice 422 can inform the developer that removal of the of the API layer and/or integration layer has impacted one or more of the deployed microservices 422.

In operation 370, the modification 350 and re-presentation 360 of the visualization 400 is repeated until the microservice deployment is completed. In operation 380, the microservices can be deployed in the microservice architecture consistent with the microservice architecture 100 defined in the prior operations. Alternatively, in lieu of deployment, the AR system 100 can provide an overall visualization of the entire microservice architecture 100. This visualization can be in the form of the visualization 400 used in creating the microservice architecture 100 or can be in the form of traditional visualizations used to display microservice architectures 100. The overall visualization can also provide additional information derived from the constructed microservice architecture 100 such a security-related information. For example, a lock could be displayed in a particular cubby A, B, C, D to indicate that this particular cubby A, B, C, D has been locked.

Figure 5:
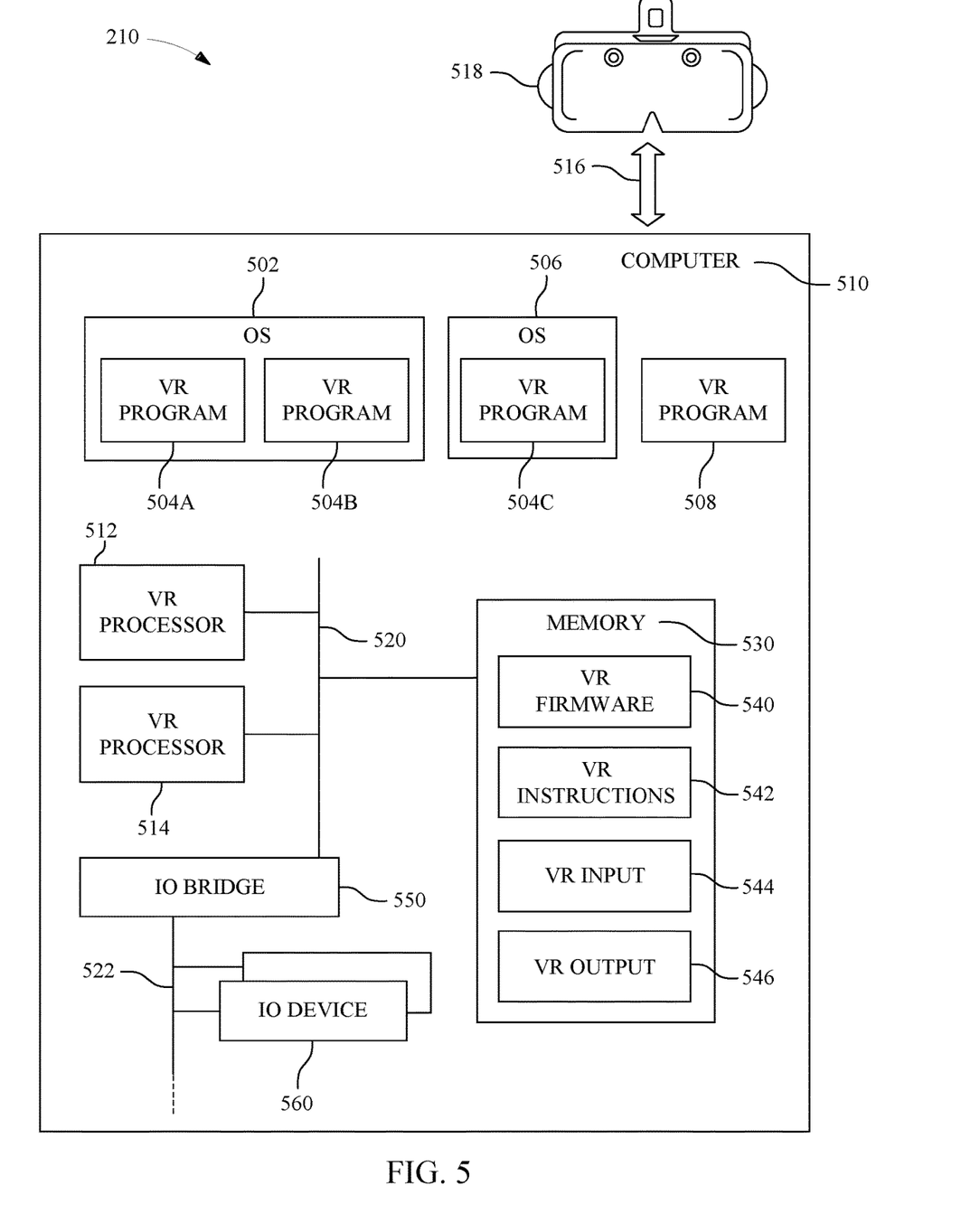
FIG. 5 is a block diagram illustrating an example computer hardware system for implementing the AR system of FIG. 1

FIG. 5 is an example of an example of the AR system 210 previously illustrated in FIG. 1. As shown, the AR system 210 includes an audio/video (A/V) headset 518, as referred to as smart glasses, augmented reality device or a virtual reality headset. The AR system 210 also includes a VR computer 510. Although illustrated as being separate from the headset 518, one or more portions of the VR computer 510 can be embedded within the headset 518. The example AR system 210, and/or components thereof, are not intended to be limiting as to the present disclosure.

The VR computer 510 can include one or more VR processors 512, 514, which can be a single processor or a multi-threaded processor, a general purpose or a special purpose processor, a co-processor, or any of a variety of processing devices that can execute computing instructions. If one or more portions of the VR computer 510 are separate from the headset 518, interface 516 couples VR computer 510 to the headset 518. The VR processors 512, 514 can be connected by memory interface 520 to memory 530, which can be a cache memory, a main memory, a flash memory, or a combination of these or other varieties of electronic hardware devices capable of storing information and, optionally, making the information, or locations storing the information within the memory, accessible to the VR processors 512, 514. The VR computer 510 can include an IO bridge 350, which can be connected to the memory 530 and/or VR processors 512, 514 by a memory interface 320. The IO bridge 550 can interface with the memory interface 520 to IO devices, such as IO device 560. The interface 522 can be any of a variety of IO interfaces, such as a PCI-Express (PCI-E) bus, and IO bridge 550 can, correspondingly, be a PCI-E bridge, and IO device 560 can be a PCI-E device (e.g., a disk drive), or PCI-E adapter (e.g., a network interface card, or a disk adapter). The IO devices 560—an be any of a variety of peripheral IO devices or IO adapters connecting to peripheral IO devices. For example, IO device 560 can be a graphic card, keyboard or other input device, a hard drive or other storage device, a network interface card, etc. Additionally, the AR system 210 can communicate with other devices, such as the development server 220 illustrated in FIG. 1, using the IO device 560.

The VR computer 510 can include instructions executable by one or more of the VR processors (or, processing elements, such as threads of a VR processor) 512, 514. As illustrated, VR computer 510 includes a plurality of programs, such as VR programs 504A, 504B, 504C (collectively, "VR programs 504"), and 508, and operating systems OS 502 and 506. The VR programs 504 can be, for example, an application program (e.g., an application for generating VR expressions), a function of an operating system (e.g., a device driver capable of operating an IO device, such as 560), or a utility or built-in function of a computer, such as 510. A VR program 504 can be a hypervisor, and the hypervisor can, for example, manage sharing resources of the computer (e.g., a VR processor or regions of a memory, or access to an IO device) among a plurality of programs or OSes. A VR program 504 can be a program that embodies the methods, or portions thereof, of the disclosure. For example, a VR program 504 can be a program that executes on a VR processor 512, 514 of VR computer 510 to perform method 300 of FIG. 2, or portions and/or modifications thereof, within the scope of the present disclosure.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 6:
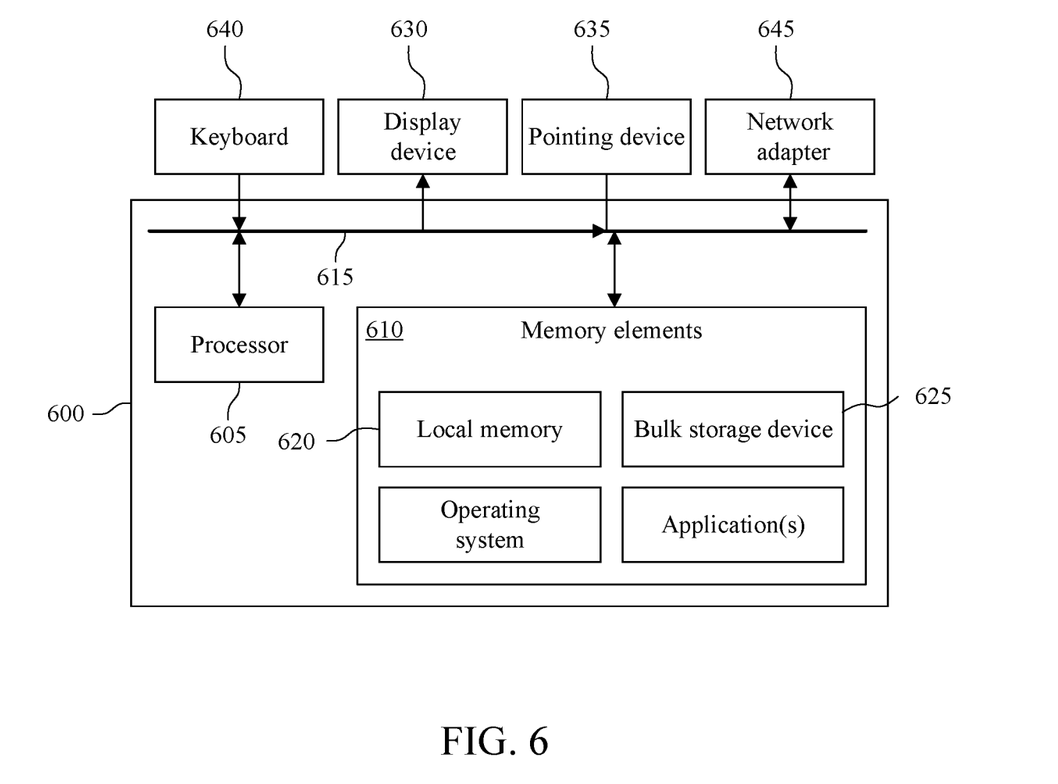
FIG. 6 is a block diagram illustrating an example of computer hardware system for implementing the development server of FIG. 2.

FIG. 6 is a block diagram illustrating example data processing system 600 for serving as the development server 220. The data processing system 600 can include at least one processor 605 (e.g., a central processing unit) coupled to memory elements 610 through a system bus 615 or other suitable circuitry. As such, the data processing system 600 can store program code within the memory elements 610. The processor 605 can execute the program code accessed from the memory elements 610 via the system bus 615. It should be appreciated that the data processing system 600 can be implemented in the form of any system including a processor and memory that is capable of performing the functions and/or operations described within this specification. For example, the data processing system 600 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 610 can include one or more physical memory devices such as, for example, local memory 620 and one or more bulk storage devices 625. Local memory 620 refers to random access memory (RAM) or other non-persistent memory device(s) generally used during actual execution of the program code. The bulk storage device(s) 625 can be implemented as a hard disk drive (HDD), solid state drive (SSD), or other persistent data storage device. The data processing system 600 also can include one or more cache memories (not shown) that provide temporary storage of at least some program code in order to reduce the number of times program code must be retrieved from the local memory 620 and/or bulk storage device 625 during execution.

Input/output (I/O) devices such as a display 630, a pointing device 635 and, optionally, a keyboard 640 can be coupled to the data processing system 600. The I/O devices can be coupled to the data processing system 600 either directly or through intervening I/O controllers. For example, the display 630 can be coupled to the data processing system 600 via a graphics processing unit (GPU), which may be a component of the processor 605 or a discrete device. One or more network adapters 645 also can be coupled to data processing system 600 to enable the data processing system 600 to become coupled to other systems, computer systems, remote printers, and/or remote storage devices through intervening private or public networks. Modems, cable modems, transceivers, and Ethernet cards are examples of different types of network adapters 645 that can be used with the data processing system 600.

As pictured in FIG. 6, the memory elements 610 can store the components of the development server 220 of FIG. 2. Being implemented in the form of executable program code, these components of the data processing system 600 can be executed by the data processing system 600 and, as such, can be considered part of the data processing system 600.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
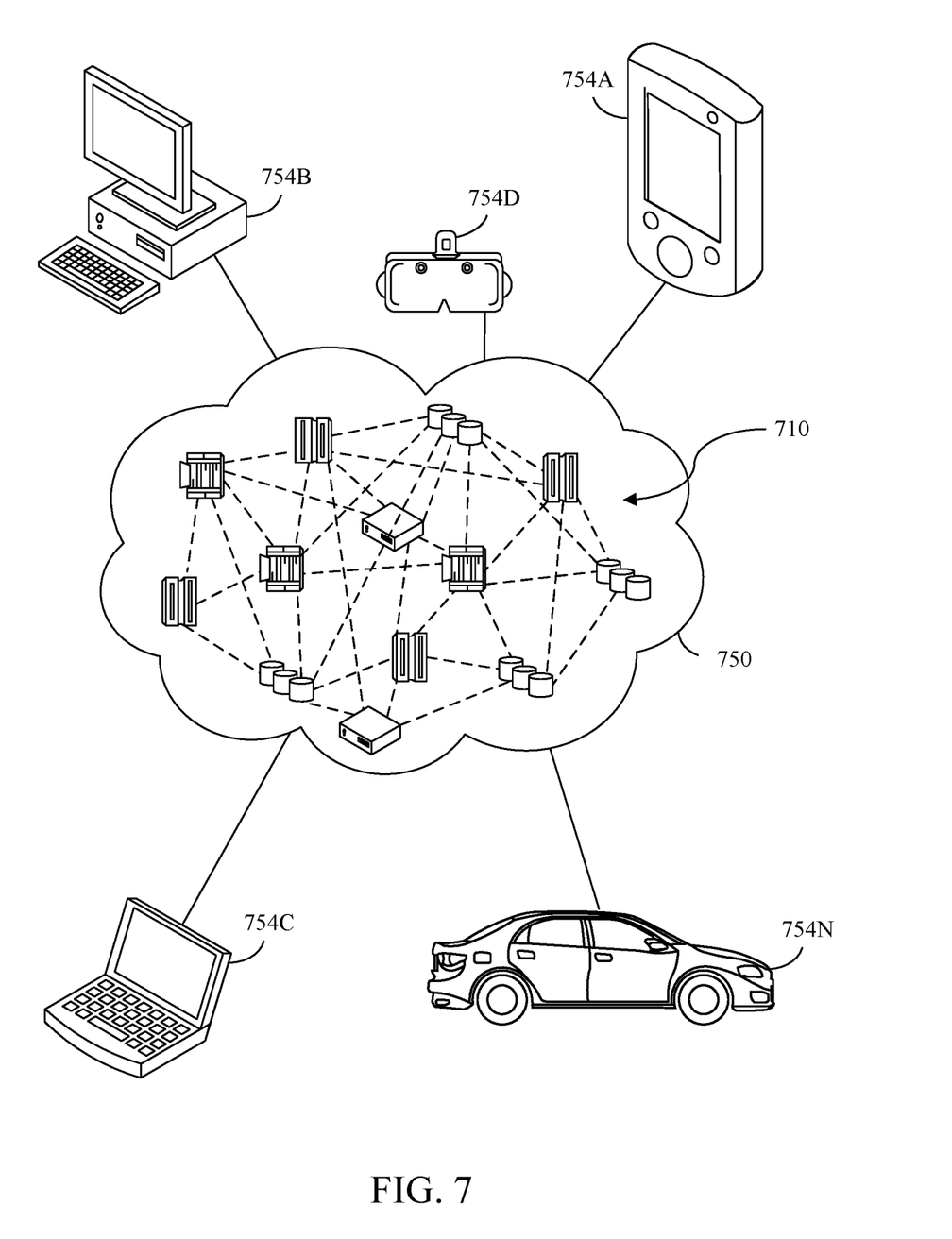
FIG. 7 depicts a cloud computing environment according to an embodiment of the present invention.

Referring now to FIG. 7, illustrative cloud computing environment 750 to be used with the API optimizing system is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, VR headset 754D, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
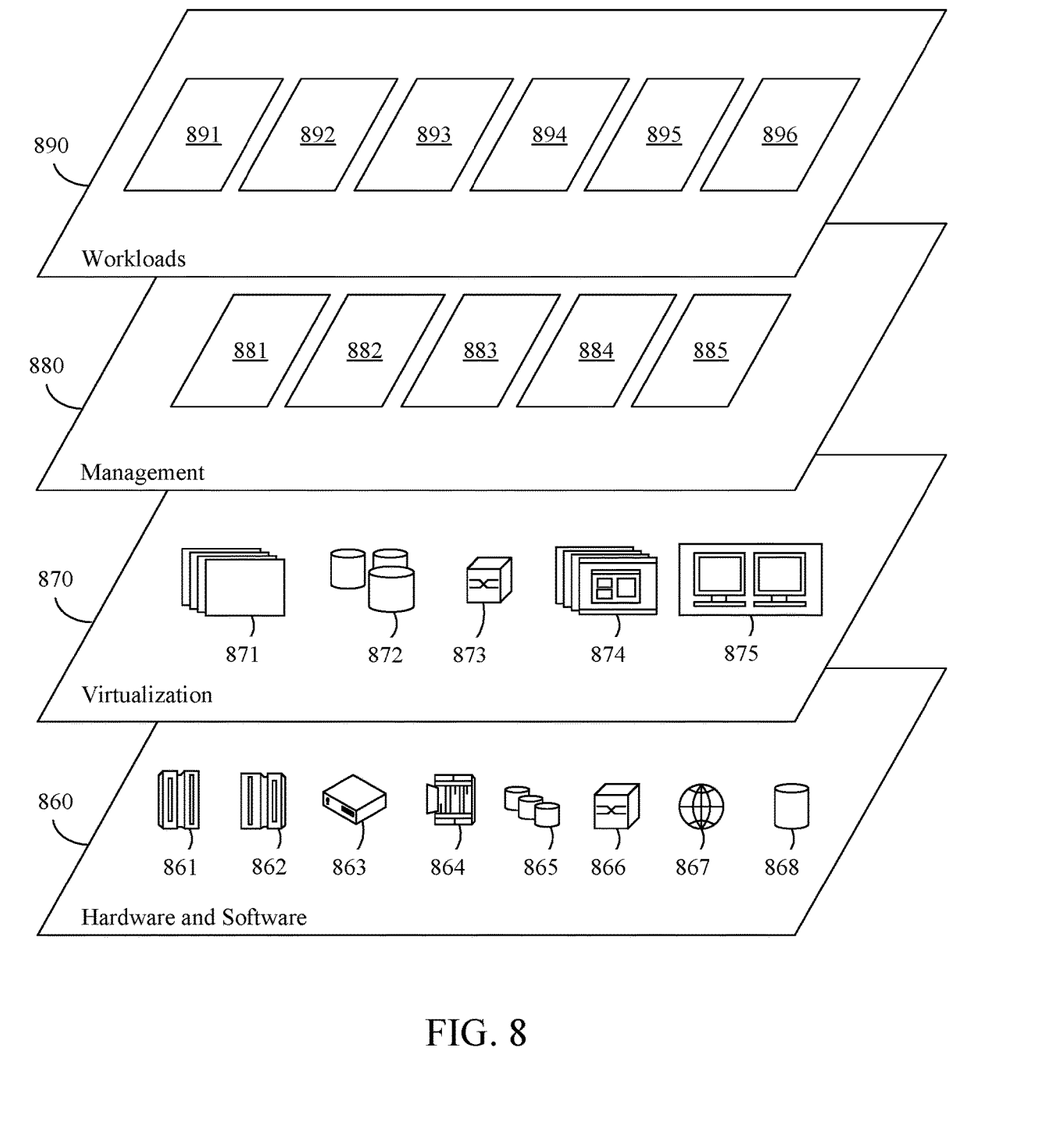
FIG. 8 depicts abstraction model layers according to an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and operations of the development server 220.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A computer-implemented process for microservice deployment using an augmented reality (AR) development system including an AR system and a development server, comprising:
   identifying, using the development server, a plurality of micro services to be deployed into an architecture, at least one integration layer in the architecture, and at least one application programming interface (API) layer in the architecture;
   generating, using the AR system, a first visualization of the architecture that includes:
      a plurality of representations respectively corresponding to the plurality of micro services to be deployed within the architecture and
      a plurality of distinct and visually identifiable locations that each respectively correspond to a unique combination of a specific API layer and a specific integration layer;
   receiving, using the AR system, an indication for modifying a placement of one of the plurality of micro services within the first visualization of the architecture; and
   generating, using the AR system, a second visualization of the architecture based upon the indication, wherein
   a first plurality of micro services within the at least one API layer are each exposed to a client application, and
   a second plurality of micro services within the at least one integration layer are each a particular integration micro service that performs a particular integration function.

2. The process of claim 1, wherein
the development server causes the plurality of microservices to be deployed within the architecture consistent with the second visualization of the architecture.

3. The process of claim 1, wherein
the plurality of distinct and visually identifiable locations are individually configured to receive at least one of the plurality of representations respectively corresponding to the plurality of micro services.

4. The process of claim 1, wherein
the development server is configured to determine, after receiving a selection of an orphaned micro service via the AR system, whether requirements of the orphaned micro service matches any particular combination of the at least one API layer and the at least one integration layer.

5. The process of claim 4, wherein
the development server makes a determination that the requirements of the orphaned microservice do not match any particular combination of the at least one API layer and the at least one integration layer, and
the development server, in response to the determination, recommends an alternative microservice to the orphaned microservice.

6. The process of claim 4, wherein
the development server makes a determination that the requirements of the orphaned microservice do not match any particular combination of the at least one API layer and the at least one integration layer, and
the development server, in response to the determination, recommends at least one of an additional API layer and an additional integration layer to the at least one integration layer in the architecture and the at least one application programming interface layer in the architecture.

7. The process of claim 1, wherein
the generating the first visualization of the architecture includes:
assigning one of the plurality of microservices to a particular one of the plurality of distinct and visually identifiable locations based upon a determination, by the development server, that the unique combination of the specific API layer and the specific integration layer corresponding to the particular one of the plurality of distinct and visually identifiable locations meets requirements of the one microservice.

8. The process of claim 1, wherein
the development server is configured to identify, at least in part, the at least one integration layer and the at least one API layer based upon one of the plurality of micro services being identified.

9. An augmented reality (AR) development system, comprising:
computer hardware including an AR system and a development server, wherein the development server is configured to perform:
identifying, using the development server, a plurality of micro services to be deployed into an architecture, at least one integration layer in the architecture, and at least one application programming interface (API) layer in the architecture, and
the AR system is configured to perform:
generating a first visualization of the architecture that includes:
a plurality of representations respectively corresponding to the plurality of micro services to be deployed within the architecture and
a plurality of distinct and visually identifiable locations that each respectively correspond to a unique combination of a specific API layer and a specific integration layer;
receiving an indication for modifying a placement of one of the plurality of micro services within the first visualization of the architecture; and
generating a second visualization of the architecture based upon the indication, wherein
a first plurality of micro services within the at least one API layer are each exposed to a client application, and
a second plurality of microservices within the at least one integration layer are each a particular integration micro service that performs a particular integration function.

10. The AR development system of claim 9, wherein
the development server causes the plurality of microservices to be deployed within the architecture consistent with the second visualization of the architecture.

11. The AR development system of claim 9, wherein
the plurality of distinct and visually identifiable locations are individually configured to receive at least one of the plurality of representations respectively corresponding to the plurality of microservices.

12. The AR development system of claim 9, wherein
the development server is configured to determine, after receiving a selection of an orphaned micro service via the AR system, whether requirements of the orphaned micro service matches any particular combination of the at least one API layer and the at least one integration layer.

13. The AR development system of claim 12, wherein
the development server makes a determination that the requirements of the orphaned microservice do not match any particular combination of the at least one API layer and the at least one integration layer, and
the development server, in response to the determination, recommends an alternative microservice to the orphaned microservice.

14. The AR development system of claim 12, wherein
the development server makes a determination that the requirements of the orphaned microservice do not match any particular combination of the at least one API layer and the at least one integration layer, and
the development server, in response to the determination, recommends at least one of an additional API layer and an additional integration layer to the at least one integration layer in the architecture and the at least one application programming interface layer in the architecture.

15. The AR development system of claim 9, wherein
the generating the first visualization of the architecture includes:
assigning one of the plurality of microservices to a particular one of the plurality of distinct and visually identifiable locations based upon a determination, by the development server, that the unique combination of the specific API layer and the specific integration layer corresponding to the particular one of the plurality of distinct and visually identifiable locations meets requirements of the one microservice.

16. The AR development system of claim 9, wherein
the development server is configured to identify, at least in part, the at least one integration layer and the at least one API layer based upon one of the plurality of micro services being identified.

17. A computer program product for micro service deployment using an augmented reality (AR) development system including an AR system and a development server, comprising:
a computer readable storage medium having stored therein program code,
the program code, which when executed by the AR development system, cause the AR development system to perform:
identifying, using the development server, a plurality of microservices to be deployed into an architecture, at least one integration layer in the architecture, and at least one application programming interface (API) layer in the architecture;

generating, using the AR system, a first visualization of the architecture that includes:
  a plurality of representations respectively corresponding to the plurality of micro services to be deployed within the architecture and
  a plurality of distinct and visually identifiable locations that each respectively correspond to a unique combination of a specific API layer and a specific integration layer;
receiving, using the AR system, an indication for modifying a placement of one of the plurality of microservices within the first visualization of the architecture;
generating, using the AR system, a second visualization of the architecture based upon the indication; and
the development server causes the plurality of microservices to be deployed within the architecture consistent with the second visualization of the architecture, wherein
a first plurality of micro services within the at least one API layer are each exposed to a client application, and
a second plurality of microservices within the at least one integration layer are each a particular integration micro service that performs a particular integration function.

18. The computer program product of claim 17, wherein the plurality of distinct and visually identifiable locations are individually configured to receive at least one of the plurality of representations respectively corresponding to the plurality of micro services, and the generating the first visualization of the architecture includes:
  assigning one of the plurality of microservices to a particular one of the plurality of distinct and visually identifiable locations based upon a determination, by the development server, that the unique combination of the specific API layer and the specific integration layer corresponding to the particular one of the plurality of distinct and visually identifiable locations meets requirements of the one microservice.

19. The computer program product of claim 17, wherein the development server is configured to determine, after receiving a selection of an orphaned microservice via the AR system, whether requirements of the orphaned microservice matches any particular combination of the at least one API layer and the at least one integration layer,
the development server makes a determination that the requirements of the orphaned microservice do not match any particular combination of the at least one API layer and the at least one integration layer, and
the development server, in response to the determination, either:
  recommends an alternative microservice to the orphaned microservice, or
  recommends at least one of an additional API layer and an additional integration layer to the at least one integration layer in the architecture and the at least one application programming interface layer in the architecture.

20. The computer program product of claim 17, wherein the development server is configured to identify, at least in part, the at least one integration layer and the at least one API layer based upon one of the plurality of micro services being identified.

* * * * *